April 20, 1937.   T. J-B. LAFITTE   2,077,940
BRAKE
Filed June 25, 1935

INVENTOR.
THEODORE JEAN BAPTISTE LAFITTE
BY
*J. W. McConkey*
ATTORNEY

Patented Apr. 20, 1937

2,077,940

UNITED STATES PATENT OFFICE 2,077,940

BRAKE

Theodore Jean-Baptiste Lafitte, Paris, France, assignor to Bendix Products Corporation, South Bend, Ind., a corporation of Indiana Application June 25, 1935, Serial No. 28,317
In France December 14, 1934

8 Claims. (Cl. 188—79.5)

This invention relates to brakes, and is illustrated as embodied in an internal expanding automobile brake.

An object of the invention is to provide the brake with a centering device or stop which is reset automatically whenever the brake is adjusted. Preferably the centering device or stop is operatively connected to the brake adjustment, so that it is automatically operated thereby.

In the arrangement illustrated in the drawing, the brake adjustment is first expanded to bring the shoes against the drum, and the parts are so connected that this shifts the stop against its shoe through a clutch or the like which slips during the last part of the movement of the adjustment.

The adjustment is then backed off to give the desired adjusted clearance, and this automatically backs the stop off half as much (i. e. the clearance for one shoe only), so that the stop is automatically set thereby to center the shoes when the brake is released.

The above and other objects and features of the invention, including various novel combinations of parts and desirable particular constructions, will be apparent from the following description of the illustrative embodiment shown in the accompanying drawing, in which.

Figure 1:
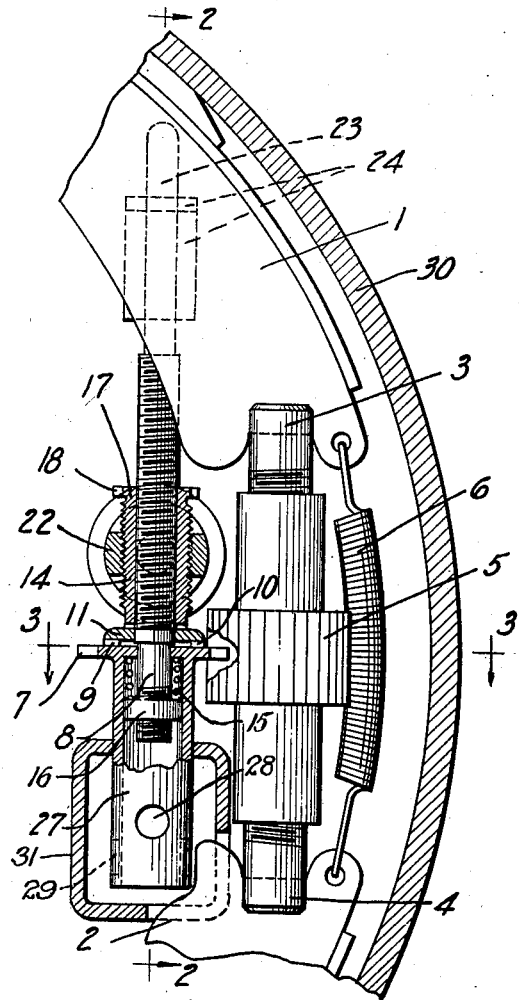
Figure 1 is a partial section through a brake showing the brake adjustment in side elevation, but with the means for shifting the stop shown in section.
Figure 2:
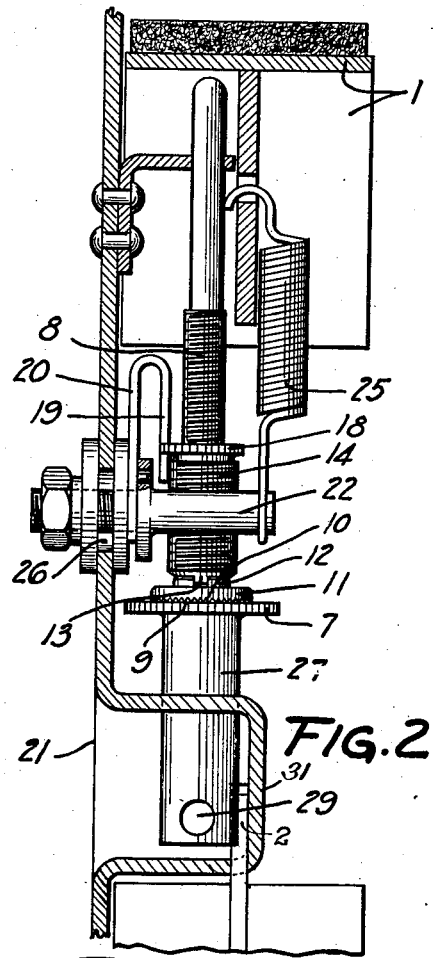
Figure 2 is a partial section on the line 2—2 of Figure 1.
Figure 3:
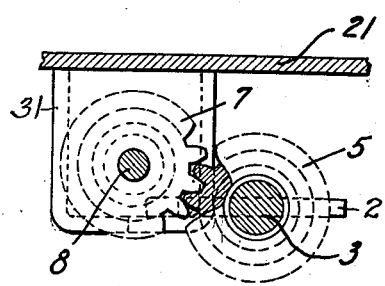
Figure 3 is a partial section on line 3—3 of Figure 1, and showing the connection between the brake adjustment and the stop.
Figure 4:
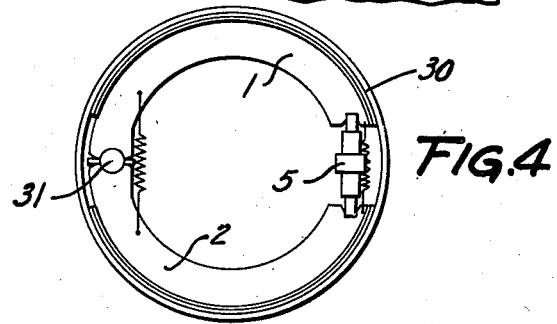
Figure 4 is a diagrammatic section illustrating one type of brake to which the stop and its adjusting connections can be applied.

The novel centering means is shown associated with a brake having shoes 1 and 2 connected by an expansible adjustment including shoe-engaging thrust members 3 and 4 threaded into sockets in a pinion or operating member 5. A spring 6 tensioned between the shoes holds the ends of the shoe webs seated in notches in the ends of the thrust members 3 and 4, thereby holding them against turning with the pinion 5, so that operation of the latter forces the shoes apart to take up for wear. The spring 6 also yieldingly interlocks with the teeth of pinion 5, to prevent unintended operation of the adjustment.

The teeth of pinion 5 are relatively long, and mesh with a pinion 7 sleeved on one end of a stop or abutment rod 8. The pinion 7 on its upper side has clutch teeth 9 engaging corresponding teeth 10 on a drive member 11 keyed on a polygonal part of the stop 8. The upper face of member 11 has a tooth or drive projection 12 engaging a similar projection 13 on a differentially threaded sleeve 14. A spring 15, compressed between pinion 7 and a nut 16 on the end of stop 8, holds the clutch teeth 9 and 10 together, while permitting them to slip when sufficient force is applied.

The upper end of the sleeve 14 has a toothed or serrated flange 17, the teeth 18 of which are yieldingly locked by a spring pawl 19, the end 20 of which is secured to the brake backing plate 21 by a post 22 secured thereto, and which has a threaded opening adjustably receiving the sleeve 14. The end of post 22 may be used for attaching a return spring 25 connected to the shoe 1.

The upper end of the abutment rod 8 forms a stop 23 slidably received in a guide 24, and engaged by the rim of shoe 1 when the brake is released.

If desired, the post 22 may be adjustable in a slot 26 in the backing plate. Also, if desired, the pinion 7 may have rigidly secured thereto a sleeve 27 formed with openings 28 and 29 for an operating tool, the sleeve 27 being shown as slidable in a guide 31.

The internal and external threads on the sleeve 14 are so proportioned that turning the pinion 5 advances the stop 23 slightly faster than the thrust member 3. Therefore, in adjusting the brake, the pinion 5 can first be turned to force the shoes against the drum 30, and the stop 23 advances slightly faster so that it presses the shoe 1 against the drum slightly before thrust member 3 reaches the end of its expanding movement, after which the clutch teeth 9—10 slip. The pinion 5 is then backed off a definite number of teeth, to give a predetermined clearance, and this automatically backs off the stop 23 by the desired clearance for the upper shoe 1, thereby centering the shoes with respect to the drum 30 when the brake is released.

While one illustrative embodiment has been described in detail, it is not my intention to limit the scope of the invention to that particular embodiment, or otherwise than by the terms of the appended claims.

I claim:

1. A brake comprising friction means, a device carried by and floating with the friction means and which is adjustable to change the effective length of the friction means, a device for actuating the adjustable device to compensate for wear of the friction means, and a centering device for the friction means which is operatively connected to and shifted and automatically set by taking up on said second device.

2. A brake comprising friction means, an adjustment for the friction means including a threaded operating member, and a centering device for the friction means which is operatively connected to said adjustment and shifted lengthwise along the axis of said member by adjustments thereof.

3. A brake comprising shiftable-anchorage friction means, an adjustable stop determining the released position of a part of the friction means, a floating adjustment for expanding the friction means to compensate for wear, and means mounted separately from the friction means and arranged to operate said adjustment without interfering with its floating movement and which is also arranged to set said stop.

4. A brake comprising a drum, friction means, an adjustable stop determining the released position of a part of the friction means, an adjustment for expanding the friction means against the drum and then backing off a definite amount to compensate for wear, and means operated by manipulation of said adjustment for automatically resetting said stop by shifting said stop against the friction means and then backing it off in proportion to said definite amount.

5. A brake comprising friction means including an adjustment having an operating pinion with elongated teeth, a stop for limiting the release movement of a part of the friction means, and a device geared to said pinion and arranged to shift said stop when the adjustment is reset.

6. A brake comprising a drum, friction means including an adjustment having an operating pinion with elongated teeth, a stop for limiting the release movement of a part of the friction means, a device operatively connected to said pinion and arranged to shift said stop when the adjustment is reset, and means incorporated in said device permitting it to slip when the friction means is brought against the drum by the adjustment, said device being operable to back the stop off and simultaneously to back off the adjustment, the backing off of the stop being in proportion to the backing off of the adjustment.

7. A brake comprising a pair of shoes connected by an expansible adjustment, an adjustable stop for one of said shoes, differentially threaded means operatively connected to said adjustment and arranged to shift said stop, and a clutch arranged to slip above a certain force and arranged between said means and said adjustment.

8. A brake comprising a pair of shoes connected by an expansible adjustment, an adjustable stop for one of said shoes, and differentially threaded means operatively connected to said adjustment and arranged to shift said stop.

THEODORE JEAN-BAPTISTE LAFITTE.